US010526453B2

(12) United States Patent
Chambard et al.

(10) Patent No.: US 10,526,453 B2
(45) Date of Patent: Jan. 7, 2020

(54) ELASTOMERIC COMPOSITIONS AND THEIR APPLICATIONS

(71) Applicant: Dow Silicones Corporation, Midland, MI (US)

(72) Inventors: Gregory Chambard, Seneffe (BE); Tommy Detemmerman, Seneffe (BE); Tatiana Dimitrova, Seneffe (BE); Frederic Gubbels, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/322,632

(22) PCT Filed: Aug. 3, 2017

(86) PCT No.: PCT/EP2017/069745
§ 371 (c)(1),
(2) Date: Feb. 1, 2019

(87) PCT Pub. No.: WO2018/024858
PCT Pub. Date: Feb. 8, 2018

(65) Prior Publication Data
US 2019/0338077 A1 Nov. 7, 2019

(30) Foreign Application Priority Data

Aug. 3, 2016 (GB) .................................. 1613411.6

(51) Int. Cl.
| | | |
|---|---|---|
| C08G 77/04 | (2006.01) | |
| C08L 83/04 | (2006.01) | |
| C08K 3/36 | (2006.01) | |
| C08G 77/08 | (2006.01) | |
| C09D 183/04 | (2006.01) | |
| C08K 3/105 | (2018.01) | |
| C08K 3/04 | (2006.01) | |

(52) U.S. Cl.
CPC .............. C08G 77/08 (2013.01); C08K 3/36 (2013.01); C08L 83/04 (2013.01); C09D 183/04 (2013.01); C08K 3/04 (2013.01); C08K 3/041 (2017.05); C08K 3/105 (2018.01)

(58) Field of Classification Search
USPC ......................................................... 528/17
See application file for complete search history.

(56) References Cited

U.S. PATENT DOCUMENTS

| | | | | |
|---|---|---|---|---|
| 3,419,516 A | * | 12/1968 | Tarno ...................... | C08L 83/04 524/847 |
| 4,087,585 A | | 5/1978 | Schulz | |
| 5,194,649 A | | 3/1993 | Okawa | |
| 5,840,794 A | * | 11/1998 | Palmer .................. | C08K 5/057 524/425 |
| 6,593,413 B2 | | 7/2003 | Muramatsu et al. | |
| 2006/0194067 A1 | * | 8/2006 | Beger ..................... | C08L 83/04 428/447 |
| 2014/0238471 A1 | * | 8/2014 | Wakita .................... | C08L 83/04 136/251 |
| 2014/0350176 A1 | | 11/2014 | Fisher et al. | |
| 2017/0002201 A1 | | 1/2017 | Von Malotki et al. | |
| 2019/0177486 A1 | * | 6/2019 | Baily ....................... | C08K 5/56 |

FOREIGN PATENT DOCUMENTS

| | | |
|---|---|---|
| CN | 105440693 A | 3/2016 |
| JP | 2002012767 A | 1/2002 |
| JP | 2006342327 A | 12/2006 |
| JP | 2007119695 A | 5/2007 |
| JP | 2013234245 A | 11/2013 |
| JP | 2015507671 A | 3/2015 |
| WO | 2007117551 A1 | 10/2007 |
| WO | 2007117552 A1 | 10/2007 |
| WO | WO 2009/013309 A1 * | 1/2009 |
| WO | 2013100175 A1 | 7/2013 |
| WO | 2015091396 A1 | 6/2015 |
| WO | 2016120270 A1 | 8/2016 |
| WO | 2017030128 A1 | 2/2017 |

OTHER PUBLICATIONS

International Search Report for related Application No. PCT/EP2017/069745, dated Nov. 9, 2017, 3 pages.
International Preliminary Report on Patentability with Transmittal and Annex for related Application No. PCT/EP2014/069745, dated Jun. 26, 2018, 13 pages.
Noll, W. "Chemistry and Technology of Silicones," Academic Press Inc., New York, 1968, pp. 397 and 399.
Michael A. Brook, "Silicon in Organic Organometallic and Polymer Chemistry," John Wiley & Sons, Inc., 2000, p. 285.
International Standard (ISO), "General methods of test for pigments and extenders—Part 2: Determination of matter volatile at 105C," 787-2, 1981.
Machine assisted English translation of JP2006342327A obtained from https://worldwide.espacenet.com on Oct. 16, 2019, 10 pages.
Machine assisted English translation of JP2007119695A obtained from https://worldwide.espacenet.com on Oct. 16 2019, 10 pages.
Machine assisted English translation of JP2013234245A obtained from https://worldwide.espacenet.com on Oct. 16, 2019, 9 pages.
Machine assisted English translation of CN105440693A obtained from https://worldwide.espacenet.com on Oct. 16, 2019, 5 pages.
Machine assisted English translation of WO2017030128A1 obtained from https://worldwide.espacenet.com on Oct. 16, 2019, 38 pages.

* cited by examiner

*Primary Examiner* — Marc S Zimmer
(74) *Attorney, Agent, or Firm* — Warner Norcross + Judd LLP

(57) ABSTRACT

The present disclosure generally relates to 2 part silicone compositions which cure via a condensation cure chemistry using titanium and/or zirconium based catalysts to generate elastomeric or gel end products and the applications for same.

18 Claims, No Drawings

ELASTOMERIC COMPOSITIONS AND THEIR APPLICATIONS

CROSS-REFERENCE TO RELATED APPLICATIONS

This application is the National Stage of International Application No. PCT/EP2017/069745 filed on 3 Aug. 2017, which claims priority to and all advantages of Great Britain Patent Appl. No. 1613411.6 filed on 3 Aug. 2016, the content of which is hereby incorporated by reference.

The present disclosure generally relates to 2 part silicone compositions which cure via a condensation cure chemistry using titanium and/or zirconium based catalysts to generate elastomeric or gel end products and the applications for same.

In many instances silicone based materials such as elastomers or gels used as coating, potting, and encapsulating materials must maintain adhesion to substrates and/or other materials. In electronics for example, gels are a special class of encapsulants that cure to form an extremely soft material. They are used to provide high levels of stress relief to sensitive circuitry. Both gels and elastomers perform many important functions in electronics. Their major job is to protect electronic assemblies and components from adverse environments by:

functioning as dielectric insulation,
  protecting the circuit from moisture and other contaminants and
  relieving mechanical and thermal stress on components.

In such situations the gels are required to adhere to electronic and electrical components and printed circuit boards in addition to the electrical connectors and conductors that pass through the coating or encapsulating material.

The commercial silicone materials that are currently used to form the encapsulants and pottants etc. (e.g. gels) are expensive being based on addition cure chemistry, i.e. they are cured by the reaction of a silicon hydride group with an unsaturated carbon radical with the help of a catalyst, which is typically a platinum based compound. Historically the industry has preferred addition cure compositions of this type for these applications because they immediately cure throughout the body of the compound resulting in a cured material in a matter of minutes whilst condensation cure systems are significantly slower, titanate cured condensation processes can take e.g. up to 7 days curing per 6 mm of depth of the body of the uncured material. Tin cured condensation systems do cure over a shorter period but they are not desired for e.g. electronics applications because they undergo reversion (i.e. depolymerisation) at temperatures above 80° C.

Whilst from a cure speed standpoint materials made from hydrosilylation cure compositions are excellent there are several potential problems and/or disadvantages with their use. For example, they are generally cured at elevated temperature (i.e. in excess of 100° C.) and can be contaminated and rendered uncurable due to inactivation of expensive platinum based cure catalysts which are sensitive and may be poisoned by amine containing compounds, sulphur containing compounds and phosphorus containing compounds.

It is well known to people skilled in the art that alkoxy titanium compounds—i.e. alkyl titanates—are suitable catalysts for formulating one component moisture curable silicones (References: Noll, W.; Chemistry and Technology of Silicones, Academic Press Inc., New York, 1968, p. 399, Michael A. Brook, silicon in organic, organometallic and polymer chemistry, John Wiley & sons, Inc. (2000), p. 285). Titanate catalysts have been widely described for their use to formulate skin or diffusion cured one-part condensation curing silicone elastomers. These formulations are typically available in one-part packages that are applied in a layer that is thinner than typically 15 mm. Layers thicker than 15 mm are known to lead to uncured material in the depth of the material, because the moisture is very slow to diffuse in very deep sections. Skin or diffusion cure (e.g. moisture/condensation) takes place when the initial cure process takes place by the formation of a cured skin at the composition/air interface subsequent to the sealant/encapsulant being applied on to a substrate surface. Subsequent to the generation of the surface skin the cure speed is dependent on the speed of diffusion of moisture from the sealant/encapsulant interface with air to the inside (or core), and the diffusion of condensation reaction by-product/effluent from the inside (or core) to the outside (or surface) of the material and the gradual thickening of the cured skin over time from the outside/surface to the inside/core.

Multi component compositions designed to activate condensation cure in the bulk of the product do not use titanium based catalysts. They generally use other metal catalysts such as tin or zinc catalyst, e.g. dibutyl tin dilaurate, tin octoate and/or zinc octoate (Noll, W.; Chemistry and Technology of Silicones, Academic Press Inc., New York, 1968, p. 397). In silicone compositions stored before use in two or more parts, one-part contains a filler which typically contains the moisture required to activate condensation cure in the bulk of the product. Unlike the previously mentioned diffusion cure one-part system, two-part condensation cure systems, once mixed together, enable bulk cure even in sections greater than 15 mm in depth. In this case the composition will cure (subsequent to mixing) throughout the material bulk. If a skin is formed, it will be only in the first minutes after application. Soon after, the product will become a solid in the entire mass. Titanate catalysts are not used for curing these types of two part compositions because it is well known that in the presence of a significant amount of moisture alkyl titanate catalysts will fully hydrolyse to form tetrahydroxy titanate, which is insoluble in silicone. This form of titanium loses its catalytic efficiency, leading to uncured systems. Patent publications are known to disclose two-part condensation cure silicones with examples of such curing systems. Typically, the examples disclosed identify alkyl tin catalysts as suitable for these formulations, examples of such publications include WO2007117551 A1, WO2007117552 A1, WO2013100175 A1 and WO2015091396 A1. It is significant to note that no examples in these publications or so far as we are aware in similar systems have been published with alkyl titanates as catalysts. The main reason for that is that formulations used with tin as catalyst will not cure properly if the tin catalyst is replaced by an alkyl titanate. Despite this each of the patent publications identified above list alkyl titanates despite their unsuitability for the purpose.

It is well known to people skilled in the art that titanate catalyst will not efficiently catalyse the bulk cure of such formulations due to the above mentioned inactivation. Herein, two-part condensation cure silicone formulations are disclosed, which surprisingly can be cured with the use of alkyl titanates providing boundary conditions for such formulations are followed for the cure process.

There is provided an elastomeric or gel material which is the condensation reaction product of a multiple part composition comprising:

(i) at least one condensation curable silyl terminated polymer having at least one, typically at least 2 hydroxyl functional groups per molecule;
(ii) a cross-linker selected from the group of
    silanes having at least 2 hydrolysable groups, alternatively at least 3 hydrolysable groups per molecule group; and/or
    silyl functional molecules having at least 2 silyl groups, each silyl group containing at least one hydrolysable group
(iii) one or more hydrous fillers; and
(iv) a condensation catalyst selected from the group of titanates, zirconates;
wherein polymer (i), cross-linker (ii) and catalyst (iv) are not stored together in the same part; and characterised in that the catalyst is present in a molar amount which is at least 50% of the moisture present cumulatively in the parts of the composition as determined in accordance with ISO 787-2: 1981.

There is also provided a multiple part condensation curable elastomer or gel composition based on titanate/zirconate cure catalysts comprising
(i) at least one condensation curable silyl terminated polymer having at least one, typically at least 2 hydrolysable and/or hydroxyl functional groups per molecule;
(ii) a cross-linker selected from the group of
    silanes having at least 2 hydrolysable groups, alternatively at least 3 hydrolysable groups per molecule group; and/or silyl functional molecules having at least 2 silyl groups, each silyl group containing at least one hydrolysable group (iii) one or more hydrous fillers;
(iii) one or more hydrous fillers; and
(iv) a condensation catalyst selected from the group of titanates, zirconates;
wherein polymer (i), cross-linker (ii) and catalyst (iv) are not all stored together in the same part; and characterised in that the catalyst is present in a molar amount which is at least 50% of the moisture present cumulatively in the parts of the composition as determined in accordance with ISO 787-2: 1981.

Typically the hydrous filler (iii) and catalyst (iv) will be stored in different parts.

In one embodiment the composition has the added requirement that the molar ratio of the excess of catalyst M-OR functions to the total of silicon bonded hydroxyl groups is comprised between 0.01:1 and 0.5:1, where M is titanium or zirconium.

The total silicon bonded hydroxyl (Si—OH) molar content is calculated for 100 g of the mixed formulation. The silicon bonded hydroxyl molar content related to a polymer is equal to the amount in g of hydroxyl containing polymer in 100 g of the mixed product divided by the number average molecular weight (Mn) of the polymer multiply by the average number of hydroxyl functions present in the polymer, typically 2. If there are several hydroxyl functional polymers in the formulation, the sum of the molar content of each polymer is sum up to constitute the total silanol content in the formulation.

The total hydrolysable groups molar content is calculated for 100 g of the mixed formulation. The molar content of hydrolysable groups related to a substance is equal to the amount in g of the molecule that contains the hydrolysable groups in 100 g of the mixed product divided by the molecular weight of the molecule or the number average molecular weight (Mn) in case it is a polymeric molecule multiply by the average number of hydrolysable functions present in the molecule. The sum of the molar content of each molecule or polymer is sum up to constitute the total molar content of hydrolysable groups in the formulation.

The molar ratio of silicon bonded hydroxyl groups in polymer (i) to hydrolysable groups from cross-linker (ii) is then calculated by dividing the total molar content of silicon bonded hydroxyl (Si—OH) groups in polymer (i) by the total molar content of hydrolysable groups from cross-linker (ii) or may be depicted as a ratio.

The number average molecular weight (Mn) and weight average molecular weight (Mw) of silicone can also be determined by Gel permeation chromatography (GPC). This technique is a standard technique, and yields values for Mw (weight average), Mn (number average) and polydispersity index (PI) (where PI=Mw/Mn).

Mn value provided in this application have been determined by GPC and represent a typical value of the polymer used. If not provided by GPC, the Mn may also be obtained from calculation based on the dynamic viscosity of said polymer.

The catalyst M-OR value is =[(g of Titanate catalyst)* (number of OR in compound)] divided by the (molecular weight of Titanium catalyst).

The main advantages of these compositions are that they cure at room temperature, to form elastomers or gels with the catalyst utilised (condensation) being more resistant to contaminants than platinum cure silicones and provide, unlike tin catalysed compositions, a resistance to reversion when subjected to high temperature and high humidity. It has been identified that cure of these compositions is much faster than typical titanate or zirconate catalysed condensation reactions would anticipate, i.e. can be lower than 1 hour as opposed to days for standard 1 part titanate cured materials. Furthermore, a two part titanate formulation as hereinbefore described using fumed silica and containing adhesion promoter has unexpectedly been seen to develop adhesion on glass and anodized aluminium after less than 1 day.

Polymer (i) is at least one moisture/condensation curable silyl terminated polymer. Any suitable moisture/condensation curable silyl terminated polymer may be utilised including polydialkyl siloxanes, alkylphenyl siloxane, or organic based polymers with silyl terminal groups e.g. silyl polyethers, silyl acrylates and silyl terminated polyisobutylenes or copolymers of any of the above. Preferably the polymer is a polysiloxane based polymer containing at least two hydroxyl or hydrolysable groups, most preferably the polymer comprises terminal hydroxyl or hydrolysable groups. Examples of suitable hydroxyl groups include —Si(OH)$_3$, —(R$^a$)Si(OH)$_2$, —(R$^a$)$_2$Si(OH), or —(R$^a$)$_2$Si—R$^c$—SiR$^d_p$(OH)$_{3-p}$ where each R$^a$ independently represents a monovalent hydrocarbyl group, for example, an alkyl group, in particular having from 1 to 8 carbon atoms, (and is preferably methyl); each R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2.

Preferably polymer (i) has the general formula:

$$X^3\text{-}A\text{-}X^1 \tag{1}$$

where $X^3$ and $X^1$ are independently selected from siloxane groups which terminate in hydroxyl or hydrolysable groups and A is a siloxane and/or organic containing polymeric chain, alternatively a siloxane polymeric chain.

Examples of hydroxyl-terminating or hydrolysable groups $X^3$ or $X^1$ include —Si(OH)$_3$, —(R$^a$)Si(OH)$_2$, —(R$^a$)$_2$Si(OH), or —(R$^a$)$_2$Si—R$^c$— Si(R$^d$)$_p$(OH)$_{3-p}$ as defined above. Preferably the $X^3$ and/or $X^1$ terminal groups are hydroxydialkyl silyl groups, e.g. hydroxydimethyl silyl groups or alkoxydialkyl silyl groups e.g. methoxydimethyl silyl or ethoxydimethyl silyl.

Examples of suitable siloxane groups in polymeric chain A of formula (I) are those which comprise a polydiorganosiloxane chain. Thus polymeric chain A preferably includes siloxane units of formula (2)

$$—(R^5{}_sSiO_{(4-s)2})—\qquad(2)$$

in which each $R^5$ is independently an organic group such as a hydrocarbyl group having from 1 to 10 carbon atoms optionally substituted with one or more halogen group such as chlorine or fluorine and s is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups $R^5$ are methyl.

Typically the polymers of the above type will have a viscosity in the order of 1000 to 300 000 mPa·s, alternatively 1000 to 100 000 mPa·s at 23° C. measured by using a Brookfield cone plate viscometer (RV DIII) using the most suitable cone plate for the viscosity concerned.

The polymer (i) may alternatively be an organic based polymer having silyl terminal groups, each bearing at least one hydrolysable group. Typical silyl terminated polymers groups include silyl terminated polyethers, silyl terminated acrylates and silyl terminated polyisobutylenes. The silyl groups utilised will be one or more alternatives described above as $X_1$ and $X_3$ as discussed above.

Preferred polysiloxanes containing units of formula (2) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

In accordance with the present invention polymeric chain A may alternatively be organic based polymers with silyl terminal groups e.g. silyl polyethers, silyl acrylates and silyl terminated polyisobutylenes. In the case of silyl polyethers the polymer chain is based on polyoxyalkylene based units. Such polyoxyalkylene units preferably comprise a linear predominantly oxyalkylene polymer comprised of recurring oxyalkylene units, ($—C_nH_{2n}—O—$) illustrated by the average formula ($—C_nH_{2n}—O—$)$_y$ wherein n is an integer from 2 to 4 inclusive and y is an integer of at least four. The average molecular weight of each polyoxyalkylene polymer block may range from about 300 g/mol to about 10,000 g/mol, but can be higher in molecular weight. Moreover, the oxyalkylene units are not necessarily identical throughout the polyoxyalkylene monomer, but can differ from unit to unit. A polyoxyalkylene block or polymer, for example, can be comprised of oxyethylene units, ($—C_2H_4—O—$); oxypropylene units ($—C_3H_6—O—$); or oxybutylene units, ($—C_4H_8—O—$); or mixtures thereof.

Other polyoxyalkylene units may include for example: units of the structure

-[—$R^e$—O—(—$R^f$—O—)$_w$-Pn-C$R^g{}_2$-Pn-O—(—$R^f$—O—)$_q$—$R^e$]— in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is, a hydrogen atom or methyl group and each of the subscripts w and q is a positive integer in the range from 3 to 30.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Crosslinkers (ii) that can be used are generally moisture curing
  silanes having at least 2 hydrolysable groups, alternatively at least 3 hydrolysable groups per molecule group; and/or
  silyl functional molecules having at least 2 silyl groups, each silyl group containing at least one hydrolysable group.

In some instances, the crosslinker (ii) having two hydrolysable groups may be considered a chain extender, i.e. when polymer (i) only has 1 or two reactive groups, but can be used to cross-link if polymer (i) has 3 or more reactive groups per molecule. The crosslinker (ii) may thus have two but alternatively has three or four silicon-bonded condensable (preferably hydroxyl and/or hydrolysable) groups per molecule which are reactive with the condensable groups in polymer (i).

For the sake of the disclosure herein a silyl functional molecule is a silyl functional molecule containing two or more silyl groups, each silyl group containing at least one hydrolysable group. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain.

For the sake of the disclosure herein a disilane is a silyl functional molecule having at least 2 silyl groups where the two silicon atoms are bonded to one another.

The hydrolysable groups on the silyl groups include acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy). In some instances, the hydrolysable group may include hydroxyl groups.

The silane cross-linker (ii) may include alkoxy functional silanes, oximosilanes, acetoxy silanes, acetonoxime silanes and/or enoxy silanes.

When the crosslinker is a silane and when the silane has only three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. The fourth silicon-bonded organic groups may be methyl.

A typical silane may be described by formula (3)

$$R''_{4-r}Si(OR^5)_r \qquad (3)$$

wherein $R^5$ is described above and r has a value of 2, 3 or 4. Typical silanes are those wherein R" represents methyl, ethyl or vinyl or isobutyl. R" is an organic radical selected from linear and branched alkyls, allyls, phenyl and substituted phenyls, acethoxy, oxime. In some instances, $R^5$ represents methyl or ethyl and r is 3.

Another type of suitable crosslinkers (ii) are molecules of the type $Si(OR^5)_4$ where $R^5$ is as described above, alternatively propyl, ethyl or methyl. Partials condensates of $Si(OR^5)_4$ may also be considered.

In one embodiment the cross-linker (ii) is a silyl functional molecule having at least 2 silyl groups each having at least 1 and up to 3 hydrolysable groups, alternatively each silyl group has at least 2 hydrolysable groups.

The crosslinker (ii) may be a disilyl functional polymer, that is, a polymer containing two silyl groups, each containing at least one hydrolysable group such as described by the formula (4)

$$(R^4O)_m(Y^1)_{3-m}-Si(CH_2)_x-((NHCH_2CH_2)_tQ \\ (CH_2)_x)_n-Si(OR^4)_m(Y^1)_{3-m} \qquad (4)$$

where $R^4$ is a $C_{1-10}$ alkyl group, $Y^1$ is an alkyl groups containing from 1 to 8 carbons, Q is a chemical group containing a heteroatom with a lone pair of electrons e.g. an amine, N-alkylamine, or urea; each x is an integer of from 1 to 6, t is 0 or 1; each m is independently 1, 2 or 3 and n is 0 or 1.

The silyl (e.g. disilyl) functional crosslinker (ii) may have a siloxane or organic polymeric backbone. Suitable polymeric crosslinkers (ii) may have a similar polymeric backbone chemical structure to polymeric chain A as depicted in formula (1) above. In the case of such siloxane or organic based cross-linkers the molecular structure can be straight chained, branched, cyclic or macromolecular, i.e. a silicone or organic polymer chain bearing alkoxy functional end groups include polydimethylsiloxanes having at least one trialkoxy terminal where the alkoxy group may be a methoxy or ethoxy group.

In the case of siloxane based polymers the viscosity of the cross-linker will be within the range of from 0.5 mPa·s to 80,000 mPa·s at 23° C. using a Brookfield cone plate viscometer (RV DIII) utilising a cone plate (measured in the same manner as polymer (i)). Whilst any of the hydrolysable groups mentioned above are suitable it is preferred that the hydrolysable groups are alkoxy groups and as such the terminal silyl groups may have the formula such as —$R^aSi(OR^b)_2$, —$Si(OR^b)_3$, —$R^a_2SiOR^b$ or —$(R^a)_2Si$—$R^c$—$SiR^d_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl group having up to 6 carbon atoms; $R^c$ is a divalent hydrocarbon group which may be interrupted by one or more siloxane spacers having up to six silicon atoms; and p has the value 0, 1 or 2. Typically each terminal silyl group will have 2 or 3 alkoxy groups.

Crosslinkers (ii) thus include alkyltrialkoxysilanes such as methyltrimethoxysilane (MTM) and methyltriethoxysilane, tetraethoxysilane, partially condensed tetraethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris (isopropenoxy)silane, ethylpolysilicate, n-propylorthosilicate, ethylorthosilicate, dimethyltetraacetoxydisiloxane, oximosilanes, acetoxy silanes, acetonoxime silanes, enoxy silanes and other such trifunctional alkoxysilanes as well as partial hydrolytic condensation products thereof; 1,6-bis (trimethoxysilyl)hexane (alternatively known as hexamethoxydisilylhexane), bis (trialkoxysilylalkyl)amines, bis (dialkoxyalkylsilylalkyl)amine, bis (trialkoxysilylalkyl)N-alkylamine, bis (dialkoxyalkylsilylalkyl)N-alkylamine, bis (trialkoxysilylalkyl)urea, bis (dialkoxyalkylsilylalkyl) urea, bis (3-trimethoxysilylpropyl) amine, bis (3-triethoxysilylpropyl)amine, bis (4-trimethoxysilylbutyl)amine, bis (4-triethoxysilylbutyl) amine, bis (3-trimethoxysilylpropyl)N-methylamine, bis (3-triethoxysilylpropyl)N-methylamine, bis (4-trimethoxysilylbutyl)N-methylamine, bis (4-triethoxysilylbutyl)N-methylamine, bis (3-trimethoxysilylpropyl)urea, bis (3-triethoxysilylpropyl)urea, bis (4-trimethoxysilylbutyl)urea, bis (4-triethoxysilylbutyl)urea, bis (3-dimethoxymethylsilylpropyl)amine, bis (3-diethoxymethyl silylpropyl)amine, bis (4-dimethoxymethylsilylbutyl)amine, bis (4-diethoxymethyl silylbutyl)amine, bis (3-dimethoxymethylsilylpropyl) N-methylamine, bis (3-diethoxymethyl silylpropyl)N-methylamine, bis (4-dimethoxymethylsilylbutyl)N-methylamine, bis (4-diethoxymethyl silylbutyl)N-methylamine, bis (3-dimethoxymethylsilylpropyl)urea, bis (3-diethoxymethyl silylpropyl)urea, bis (4-dimethoxymethylsilylbutyl)urea, bis (4-diethoxymethyl silylbutyl)urea, bis (3-dimethoxyethylsilylpropyl)amine, bis (3-diethoxyethyl silylpropyl)amine, bis (4-dimethoxyethylsilylbutyl)amine, bis (4-diethoxyethyl silylbutyl)amine, bis (3-dimethoxyethylsilylpropyl)N-methylamine, bis (3-diethoxyethyl silylpropyl)N-methylamine, bis (4-dimethoxyethylsilylbutyl)N-methylamine, bis (4-diethoxyethyl silylbutyl)N-methylamine, bis (3-dimethoxyethylsilylpropyl)urea bis (3-diethoxyethyl silylpropyl)urea, bis (4-dimethoxyethylsilylbutyl)urea and/or bis (4-diethoxyethyl silylbutyl)urea; bis (triethoxysilylpropyl)amine, bis (trimethoxysilylpropyl)amine, bis (trimethoxysilylpropyl)urea, bis (triethoxysilylpropyl)urea, bis (diethoxymethylsilylpropyl)N-methylamine; di or trialkoxy silyl terminated polydialkyl siloxane, di or trialkoxy silyl terminated polyarylalkyl siloxanes, di or trialkoxy silyl terminated polypropyleneoxide, polyurethane, polyacrylates; polyisobutylenes; di or triacetoxy silyl terminated polydialkyl; polyarylalkyl siloxane; di or trioximino silyl terminated polydialkyl; polyarylalkyl siloxane; di or triacetonoxy terminated polydialkyl or polyarylalkyl. The cross-linker (ii) used may also comprise any combination of two or more of the above.

The one or more hydrous fillers (iii) may be one or more reinforcing fillers and or one or more non-reinforcing fillers or a mixture thereof. For the sake of this application the term hydrous means that the filler(s) have a moisture (i.e. water) content of >0.05% by weight as determined in accordance with ISO 787-2:1981 For the avoidance of doubt use of the term moisture is intended to mean water and does not include Si-alkoxy groups or Si bonded hydroxyl groups in both case discussed elsewhere.

Examples of finely divided, hydrous reinforcing fillers include high surface area fumed and precipitated silicas including rice hull ash and to a degree calcium carbonate. Examples of or additional finely divided hydrous non-reinforcing fillers include as crushed quartz, diatomaceous earths, barium sulphate, iron oxide, titanium dioxide and carbon black, talc, wollastonite. Other hydrous fillers which might be used alone or in addition to the above include carbon nanotubes, e.g. multiwall carbon nanotubes aluminite, hollow glass spheres, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Further alternative fillers include aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$.

The ring silicates group comprises silicate minerals, such as but not limited to, cordierite and $Al_3(Mg,Fe)_2[Si_4AlO_{16}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6AlO_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

The thermally conductive filler and/or the anhydrous reinforcing and/or extending filler if present, may optionally be surface treated with a treating agent. Treating agents and treating methods are known in the art, The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally the surface treatment renders the filler(s) hydrophobic and therefore easier to handle and obtain a homogeneous mixture with the other components in the composition. Silanes such as

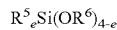

$$R^5{}_eSi(OR^6)_{4-e}$$

wherein $R^5$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, with the alkyl groups of 6 to 20 carbon atoms being preferred. $R^6$ is an alkyl group of 1 to 6 carbon atoms, and letter e is equal to 1, 2 or 3 may also be utilised as the treating agent for fillers.

The composition further comprises a condensation catalyst (iv) which increases the speed at which the composition cures. The catalyst chosen for inclusion in a particular silicone sealant composition depends upon the speed of cure required. Titanate and/or zirconate based catalysts may comprise a compound according to the general formula $Ti[OR^{22}]_4Zr[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{22}$ include but are not restricted to methyl, ethyl, propyl, isopropyl, butyl, tertiary butyl and a branched secondary alkyl group such as 2,4-dimethyl-3-pentyl. Preferably, when each $R^{22}$ is the same, $R^{22}$ is an isopropyl, branched secondary alkyl group or a tertiary alkyl group, in particular, tertiary butyl. Suitable examples include for the sake of example, tetra n-butyl titanate, tetra t-butyl titanate, tetra t-butoxy titanate, tetraisopropoxy titanate and diisopropoxydiethylacetoacetate titanate. Alternatively, the titanate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate. The catalyst is present in a molar amount which is at least 50% of the molar amount of moisture (i.e. water) present cumulatively in Part A and Part B of the composition as determined in accordance with ISO 787-2: 1981. Typically the vast majority of the moisture will originate from the hydrous fillers Optional Ingredients
Adhesion Promoter Suitable adhesion promoters may comprise alkoxysilanes of the formula $R^{14}{}_hSi(OR^{15})_{(4-h)}$, where subscript h is 1, 2, or 3, alternatively h is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminium chelate or zirconium chelate. Examples of adhesion promoters for hydrosilylation curable compositions may be found in U.S. Pat. Nos. 4,087,585 and 5,194,649. The curable composition may comprise, when present, 0.01% to 2 wt. %, alternatively 0.05 to 2 wt. %, alternatively 0.1 to 1 wt. % of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Additional Fillers

Thermally and/or electrically conductive fillers e.g. metallic fillers, and anhydrous meltable fillers, or a combination thereof. Metallic may be utilised. Such fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminium, copper, gold, nickel, tin, silver, and combinations thereof, and alternatively aluminium. Suitable metallic fillers are further exemplified by particles of the metals listed above having layers on their surfaces selected from the group consisting of aluminium nitride, aluminium oxide, copper oxide, nickel oxide, silver oxide, and combinations thereof. For example, the metallic filler may comprise aluminium particles having aluminium oxide layers on their surfaces.

Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 150° C. to 225° C. The meltable filler may be a eutectic alloy, a non-eutectic alloy, or a pure metal. Meltable fillers are commercially available.

The thermally conductive filler may be a single thermally conductive filler or a combination of two or more thermally conductive fillers that differ in at least one property such as particle shape, average particle size, particle size distribution, and type of filler. In some embodiments, combinations of metallic and inorganic fillers, such as a combination of aluminium and aluminium oxide fillers; a combination of aluminium and zinc oxide fillers; or a combination of aluminium, aluminium oxide, and zinc oxide fillers may be used. In other embodiments, it may be desirable to combine a first conductive filler having a larger average particle size with a second conductive filler having a smaller average particle size in a proportion meeting the closest packing theory distribution curve. An example would be mixing two aluminium oxide preparations having different average particle sizes. In other embodiments, different thermally conductive filler materials with difference sizes may be used, for example, a combination of an aluminium oxide having a larger average particle size with a zinc oxide having a smaller average particle size. Alternatively, it may be desirable to use combinations of metallic fillers, such as a first aluminium having a larger average particle size and a second aluminium having a smaller average particle size. Use of a first filler having a larger average particle size and a second filler having a smaller average particle size than the first filler may improve packing efficiency, may reduce viscosity, and may enhance heat transfer.

The shape of the thermally conductive filler particles is not specifically restricted, however, rounded or spherical particles may prevent viscosity increase to an undesirable level upon high loading of the thermally conductive filler in the composition. The average particle size of the thermally conductive filler will depend on various factors including the type of thermally conductive filler selected and the exact amount added to the curable composition, as well as the bondline thickness of the device in which the cured product of the composition will be used. In some particular instances, the thermally conductive filler may have an average particle size ranging from 0.1 micrometre to 80 micrometres, alternatively 0.1 micrometre to 50 micrometres, and alternatively 0.1 micrometre to 10 micrometres. The additional optional fillers may also be treated with treating agents as described above should the need arise.

Other optional additives include a surfactant, a flux agent, an acid acceptor, and/or an anti-corrosion additives and a combination thereof.

Suitable surfactants include silicone polyethers, ethylene oxide polymers, propylene oxide polymers, copolymers of ethylene oxide and propylene oxide, other non-ionic surfactants, and combinations thereof. The composition may comprise up to 0.05% of the surfactant based on the weight of the composition.

Flux Agent

The composition may comprise up to 2% of a flux agent based on the weight of the composition. Molecules containing chemically active functional groups such as carboxylic acid and amines can be used as flux agents. Such flux agents can include aliphatic acids such as succinic acid, abietic acid, oleic acid, and adipic acid; aromatic acids such as benzoic acids; aliphatic amines and their derivatives, such as triethanolamine, hydrochloride salts of amines, and hydrobromide salts of amines. Flux agents are known in the art and are commercially available.

Acid Acceptor

Suitable acid acceptors include magnesium oxide, calcium oxide, and combinations thereof. The composition may comprise up to 2% of Acid Acceptor based on the weight of the composition, if appropriate.

Anti corrosion additives, such as nitrogen/sulphur containing heterocyclic compounds containing a triazole structure, a thiadiazole structure, a benzotriazole structure, a mercaptothiozole structure, a mercaptobenzothiazole structure or a benzimidazole structure.

As previously indicated the condensation curable composition is stored in a multiple part manner, typically in two parts and polymer (i), cross-linker (ii) and catalyst (iv) are not all stored together in the same part. Furthermore hydrous filler (iii) and the catalyst (iv0 are typically kept separate with the filler (iii) being mixed into the polymer(i). The two parts of the composition may be mixed using any appropriate standard two-part mixing equipment with a dynamic or static mixer and the resulting mixture is optionally dispensed therefrom for use in the application for which it is intended. The two part composition might for example comprise any one of the following alternatives:

1) stored in two parts Part A having polymer (i) and cross-linker (ii) and Part B having polymer (i) and catalyst (iii); or
2) stored in two parts Part A having polymer (i) and catalyst (iv) and Part B having cross-linker (ii) or
3) stored in two parts, Part A having a first polymer (i) and cross-linker (ii) and Part B having second polymer (i) and catalyst (iv) or
4) stored in two parts, Part A containing polymer (i) and part B containing the cross-linker (ii) and catalyst (iv). Typically the filler (iii) is stored in the part which does not contain the catalyst.

The composition may alternatively be stored in 3 or more parts should the need arise. Additional additives are generally added into Part A. whilst it is anticipated that the vast majority if not all moisture in the composition will be in the hydrous filler, should any other ingredient including the optional ingredients contain moisture (water) in any form the amount of catalyst will be determined based on the total moisture content from all sources which is the value determined through ISO 787-2:1981.

There is also provided herein a method of making an elastomer or gel material as hereinbefore described whereby the aforementioned two parts of the composition are intermixed and cured. Subsequent to intermixing in one embodiment the condensation curable elastomer or gel composition may be applied on to a substrate using a suitable dispenser such as for example curtain coaters, spray devices die coaters, dip coaters, extrusion coaters, knife coaters and screen coaters which upon elastomer or gel formation provides a coating on said substrate.

Gels or elastomers in accordance with the above may be utilised in a wide variety of applications, including, for the sake of example as an encapsulant/pottant in an electronic article.

The article may be a power electronic article e.g. an electronic component with gel disposed thereon such The article may be a power electronic article e.g. an electronic component with material composition disposed thereon such that the cured material encapsulates, either partially or completely, the electronic component. Alternatively the electronic article may be an integrated circuit (IC), or light emitting diodes (LED) system or may be a printed circuit board (PCB).

The silicone material as hereinbefore described is designed for use in optical applications and electronics applications, including both microelectronics and macroelectronics applications as well as optoelectronics applications and thermally conductive electronics applications, such as making thermally conductive adhesives. Furthermore, the silicone material of the present invention may be transparent and therefore are potentially suitable for use in light-emitting semiconductor elements such as LEDs.

Cured silicone adhesives prepared from such a curable silicone composition may adhere to various substrates such as electrical or electronic components and/or parts, not least metal substrates such as gold, silver, aluminum, copper, and electroless nickel; as well as polymeric substrates such as FR4, Nylon, polycarbonate, Lucite (which is polymethylmethacrylate, PMMA), polybutylene terephthalate (PBT), and liquid crystal polymers such as Xydar®, available from Solvay Chemicals, Houston, Tex. 77098 USA.

The electrical or electronic components and/or parts may be filled with the silicone material by any appropriate method by, for example, contacting the portion of the electrical or electronic part to be protected with the silicone material, and then curing this composition by through condensation cure i.e. by letting it stand at room temperature.

Any suitable electrical or electronic part may be sealed with the silicone material as described above but because the silicone material of the present invention can suppress the occurrence of air bubbles and cracks and exhibits good bonding to electrical or electronic parts even under high-temperature conditions, it can be advantageously used in power devices used under high-temperature conditions, particularly power devices such as a motor control, a motor control for transport, a power generation system, or a space transportation system.

Furthermore, because the silicone material of the present invention has a certain degree of cold resistance in addition to the heat resistance demanded in an Si—C semiconductor chip (for example, heat resistance of 180° C. or above). The electronic article can be a power module, e.g. one of more of the aforementioned devices for power converters, inverters, boosters, traction controls, industrial motor controls, power distribution and transportation systems, especially in power devices that demand the ability to withstand sharp temperature differences, and can improve the durability and reliability of such power devices.

Examples of such power devices that demand heat resistance and cold resistance include motor controls used in cold regions such as general-purpose inverter controls, servo motor controls, machine tools or elevators, electric vehicles, hybrid cars or motor controls for rail transport used in cold regions, power generating systems used in cold regions such as solar, wind or fuel cell power generators, space transportation systems used in space, and the like. Note that "cold regions" indicates regions where the temperature falls below 0° C.

Furthermore, the silicone material is also effective in sealing electrical or electronic parts having a structure in which the space between electrodes, between electrical elements or between an electrical element and the package in the electrical or electronic part is narrow, or having a structure in which these structures cannot track to the expansion and contraction of the silicone material. For example, it may be used in electrical circuits or modules on which electrical elements such as semiconductor elements, capacitors and resistors are mounted, i.e., various sensors such as pressure sensors that are generally sealed or filled with silicone material, and automotive igniters, regulators and the like.

The electronic component may be defined as a chip, such as a silicon chip or a silicon carbide chip, one or more wires, one or more sensors, one or more electrodes, integrated circuits (ICs), e.g. hybrid ICs, power devices, insulated gate bipolar transistor (IGBT), a rectifier such as a Schottky diode, a PiN diode, a merged PiN/Schottky (MPS) rectifier and Junction barrier diode, a bipolar junction transistors (BJTs), a thyristor, a metal oxide field effect transistor (MOSFET), a high electron mobility transistor (HEMT), a static induction transistors (SIT), a power transistor, and the like.

The electronic article may include the electronic component and a first layer. The first layer is not particularly limited and may be a semiconductor, a dielectric, metal, plastic, carbon fibre mesh, metal foil, a perforated metal foil (mesh), a filled or unfilled plastic film (such as a polyamide sheet, a polyimide sheet, polyethylene naphthalate sheet, a polyethylene terephthalate polyester sheet, a polysulphone sheet, a polyether imide sheet, or a polyphenylene sulphide sheet), or a woven or nonwoven substrate (such as fibreglass cloth, fibreglass mesh, or aramid paper). Alternatively, the first layer may be further defined as a semiconductor and/or dielectric film.

The silicone material may be sandwiched between the electronic component and the first layer, and/or may be disposed on and in direct contact with the first layer, and/or on and in direct contact with the electronic component. If the silicone material is disposed on and in direct contact with the first layer, the silicone material may still be disposed on the electronic component but may include one or more layers or structures between the silicone material and the electronic component.

The disclosure also provides a method of forming aforementioned electronic article. The method may include one or more of the aforementioned steps of forming the elastomer or gel, the step of providing the elastomer or gel, and/or the step of providing the electronic component. Typically, the method includes the curable compositions as hereinbefore described onto an electronic component and curing the composition to form an elastomer or gel on the electronic component under the condition sufficient to form the elastomer or gel without damaging the component. The elastomer or gel may be formed on the electronic component. Alternatively, the elastomer or gel may be formed apart from the electronic component and subsequently be disposed on the electronic component.

Alternatively, the silicone elastomer or gel may be utilised in adhesive compositions for use as the skin-facing layer of a medical device or wound dressing. In addition to the silicone elastomer or gel adhesive composition, the medical device or wound dressing contains an absorbable or porous substrate. The absorbable substrate may be any material known to those of skill in the art capable of at least partially absorbing the exudate from a wound. Absorbable substrates include, but are not limited to, the following materials: foams (e.g., polyurethane and/or polymer foams), synthetic sponges, natural sponges, silks, keratins (e.g., wool and/or camel hair), cellulosic fibres (e.g., wood pulp fibres, cotton fibres, hemp fibres, jute fibres, and/or flax fibres), rayon, acetates, acrylics, cellulose esters, modacrylics, polymers, super-absorbent polymers (e.g., polymers capable of absorbing approximately 10 times their weight or greater), polyamides, polyesters, polyolefins, polyvinyl alcohols, and/or other materials. Combinations of one or more of the above-listed materials may also be used as the absorbable or porous substrate.

The silicone elastomer or gel as hereinbefore described may be incorporated in adhesive compositions for use as the skin-facing layer in various applications where suitable skin-facing adhesive materials are desired, e.g. in athletic apparel such as biking shorts and feminine hygiene products.

Other applications include the manufacturing of silicone adhesive tapes (e.g. polyurethane nonwoven/fabric with silicone elastomer or gel on it), elastomer or gel sheeting (e.g. polyurethane film with elastomer or gel on it), wound dressings (e.g. polyurethane film or polyurethane foam with elastomer or gel on it), bandages, adhesive strips, surgery drapes (e.g., polyethylene with gel on it), topical or transdermal patches, fragrance/cosmetics patches and the like. As most elastomer or gels prepared by curing the compositions described in this invention are visually crystal clear, these materials can be used to seal, glue or protect materials in optical devices or for any other purposes linked to its transparency. Still further potential applications include protection for light emitting diodes, gels or elastomers for implants and prosthesis, shoe sole, elastomers for drug release applications, and in tire industry as an anti-puncture material or a self-sealing pneumatic rubber tire. A self-sealing pneumatic rubber tire with a sealing band adheringly attached in the circumferential direction on the inner side of the tire, radially within the tread, with the elastomer or gel as herein before described applied on a carrier material. The invention also relates to a method for producing a self-sealing tire using a sealing band with a sealant applied on a carrier material, which sealing band is introduced into the tire and applied on the inner wall surface of the tire, running between the shoulder regions.

EXAMPLES

The fumed silica used in the Examples was a commercial product supplied by the Cabot Corporation as Cabot® LM150, which contains a maximum of 0.5% of moisture according to ISO 787-2:1981 (data sheet).

Adhesion promoter 1 was a mixture of 53.5% of methyl trimethoxysilane, 27.4% of 3-glycidoxypropyl trimethoxy silane and 21.8% of 3-aminopropyl triethoxy silane pre-condensed.

Adhesion promoter 2 was 3-aminopropyl triethoxy silane.

All viscosity measurements were made using a Brookfield cone plate viscometer RV DIII with a cone plate at 23° C. unless otherwise indicated.

The hydroxydimethylsilyl terminated polydimethyl siloxane exhibiting a viscosity at 23° C. of about 2000 mPa·s (Brookfield cone plate viscometer RV DIII using a cone plate CP-52 at 20 rpm) has an number average molecular weight (Mn) of 22,000 g/mol. The trimethoxysilyl terminated polydimethylsiloxane polymer exhibiting a viscosity at 23° C. of about 56,000 mPa·s (Brookfield cone plate viscometer RV DIII using a cone plate CP-51 at 0.5 rpm) has an number average molecular weight (Mn) of 62,000 g/mol.

Glass pieces having 70×12×4 mm³ were glued with the product formulations to produce H-pieces of joint dimensions 50×12×12 mm³. The product was left for 7 days to cure at 23° C. 50% relative humidity. 3H pieces per formulation were tested on Zwick tensiometer at a speed of 5.5 mm/min and the average of these three tests is reported in this document.

The terms "silanol", "hydroxysilyl", "SiOH" and silicon bonded hydroxyl may be used interchangeably in the scope of the present invention, to indicate a condensation curable silyl terminating group of a polymer, bearing at least one hydroxyl functional group.

The terms "alkoxy", "SiOR" may be used interchangeably in the scope of the present invention, to indicate a condensation curable silyl terminating group of a polymer, bearing at least one hydrolysable functional group.

The terms "ratio SiOH/SiOR" and "ratio silanol/alkoxy groups" may also be used interchangeably, in the scope of the present invention.

Fumed silica is Cabot LM150. Its moisture content is about 0.78% in weight of the total combined composition determined by ISO 787-2:1981.

Preparation of the Curing Agent 1

379.15 g of dimethylhydroxy silyl terminated polydimethylsiloxane polymer exhibiting a viscosity at 23° C. of about 2000 mPa·s (Brookfield cone plate viscometer RV DIII using a cone plate CP-52 at 20 rpm) and 18.96 g of fumed silica were mixed together on two occasions for a period of 30 seconds at 2000 rpm in a speedmixer. Subsequently, 1.90 g of tetra-n-butoxy titanate was added into the mixture and the whole composition was mixed on three occasions for 30 seconds at 2000 rpm in a speedmixer.

Preparation of the Curing Agent 2

379.15 g of dimethylhydroxy silyl terminated polydimethylsiloxane polymer exhibiting a viscosity at 23° C. of about 2000 mPa·s (Brookfield cone plate viscometer RV Dill using a cone plate CP-52 at 20 rpm) and 18.96 g of fumed silica were mixed together on two occasions for a period of 30 seconds at 2000 rpm in a speedmixer. Subsequently, 0.88 g of tetra-n-butoxy titanate was added into the mixture and the whole composition was mixed on three occasions for 30 seconds at 2000 rpm in a speedmixer.

Preparation of the Curing Agent 3 (Comparative)

379.15 g of dimethylhydroxy silyl terminated polydimethylsiloxane polymer exhibiting a viscosity at 23° C. of about 2000 mPa·s (Brookfield cone plate viscometer RV Dill using a cone plate CP-52 at 20 rpm) and 18.96 g of fumed silica were mixed together on two occasions for a period of 30 seconds at 2000 rpm in a speedmixer. Subsequently, 3.82 g of tetra-n-butoxy titanate is added and mixed for 30 seconds at 2000 rpm in a speedmixer. The material formed a gel, which cannot be used as a curing agent. This is because the ratio of catalyst to moisture content results in the titanate being hydrolysed losing its catalytic activity and gelling with the polymer. Hence, curing Agent 3 will not function as a curing agent.

Example 1

50 g of the curing agent 1 is mixed with 0.095 g of 1,6-bis(trimethoxysilyl)hexane with the help of a dental mixer for 30 seconds at 3200 rpm. The material was poured into a 50 ml aluminium cup and left to cure at 23° C. and 50% relative humidity.

Example 2

50 g of the curing agent 1 is mixed with 0.190 g of 1,6-bis(trimethoxysilyl)hexane with the help of a dental mixer for 30 seconds at 3200 rpm. The material was poured into a 50 ml aluminium cup and left to cure at 23° C. and 50% relative humidity.

Example 3

50 g of the curing agent 1 is mixed with 0.284 g of 1,6-bis (trimethoxysilyl)hexane with the help of a dental mixer for 30 seconds at 3200 rpm. The material was poured into a 50 ml aluminium cup and left to cure at 23° C. and 50% relative humidity.

Example 4

50 g of the curing agent 1 is mixed with 0.379 g of 1,6-bis (trimethoxysilyl)hexane with the help of a dental mixer for 30 seconds at 3200 rpm. The material was poured into a 50 ml aluminium cup and left to cure at 23° C. and 50% relative humidity.

Example 5

50 g of the curing agent 1 is mixed with 0.484 g of 1,6-bis (trimethoxysilyl)hexane with the help of a dental mixer for 30 seconds at 3200 rpm. The material was poured into a 50 ml aluminium cup and left to cure at 23° C. and 50% relative humidity.

Example 6

50 g of the curing agent 1 is mixed with 0.948 g of 1,6-bis (trimethoxysilyl)hexane with the help of a dental mixer for 30 seconds at 3200 rpm. The material was poured into a 50 ml aluminium cup and left to cure at 23° C. and 50% relative humidity.

Example 7

50 g of the curing agent 1 is mixed with 1.896 g of 1,6-bis (trimethoxysilyl)hexane with the help of a dental mixer for 30 seconds at 3200 rpm. The material was poured into a 50 ml aluminium cup and left to cure at 23° C. and 50% relative humidity.

Counter Examples 1 to 7

A series of comparative examples were undertaken. They were identical to the above examples 1 to 7 other than Curing Agent 1 being replaced by curing Agent 2. It was found that the compositions generated containing curing Agent 2 as described above did not cure. The molar content of titanate catalyst in this formulation is below 50% of the molar content of moisture.

In Table 1 below physical properties of the cured products from examples 1 to 7 were analysed. A TA XT plus texture analyser from Stable Micro systems is used to monitor the hardness (Force) of the curing or cured elastomer or gel. The probe used is a polycarbonate cylinder terminated by a spherical end. The diameter of the probe and sphere is ½ inch (1.27 cm). A return to start program is used. The pre-test speed was 5 mm/s and the trigger force was 0.1 g (no measurement until trigger force is 0.1 g). The test speed used was 1 mm/s. The probe was inserted to a distance of 5 mm in the cured material and then removed to a distance where no significant force is measured i.e. measures force needed in g to go down 5 mm within the material sample being tested and then similarly when the probe has penetrated the sample by 5 mm it returns to its starting position and the force need to return to the starting position is measured. The latter value is typically zero as material hard (negative force=tackiness) system can therefore measure hardness and tackiness. The maximum positive force is measured and reported here.

Appearance was determined by touching gently the surface with the finger. If the material was easy to deform with the finger it was reported as being a gel. If not it was reported as being an elastomer.

TABLE 1

|  | Ex1 | Ex2 | Ex3 | Ex4 | Ex5 | Ex6 | Ex7 |
|---|---|---|---|---|---|---|---|
| Force after 3 h | 11 | 21 | 51 | 64 | 158 | 124 | 57 |
| Force after 24 h | 17 | 36 | 172 | 600 | 923 | 834 | 217 |
| Force after 48 h | 15 | 38 | 156 | 662 | 1173 | 1307 | 310 |
| Force after 7 days | 21 | 51 | 219 | 805 | 1347 | 2858 | 2604 |
| Appearance after 7 days | Gel | Gel | Gel | Elastomer | Elastomer | Elastomer | Elastomer |
| ASTM 2240-E5 (2010) Type A Hardness | 0 | 0 | 0 | 0 | 1 | 15 | 17 |

It can be seen that examples 1 to 6 are fast curing materials, which exhibit a bulk cure after a few hours. Example 7 is showing a skin cure in the early time of cure, i.e. only the surface is cured, not the bulk of the material. Bulk cure is however achieved later in between 48 h and 7 days. Example 7 is consider to be curing as a standard diffusion cure one part titanate, while other examples are curing as standard bulk cure two part condensation systems. Example 1 to 7 have a molar content of titanate catalyst in this formulation is above 50% of the molar content of moisture in opposition to their respective comparative examples.

Comparative Examples 8 & 9. According to WO2013100175

Comparative Example 8

This comparative example is derived from Example 1 of WO2013100175, which described two-part formulations where tin is used as catalyst.

Part A 51.9 g of Hydroxydimethylsilyl terminated polydimethyl siloxane exhibiting a viscosity at 23° C. of about 4,000 mPa·s (Brookfield cone plate viscometer RV DIII using a cone plate CP-52 at 20 rpm) was mixed with 25.95 g of trimethylsilyl terminated polydimethyl siloxane exhibiting a viscosity at 23° C. of about 100 mPa·s (Brookfield cone plate viscometer RV DIII using a cone plate CP-52 at 20 rpm) for a period of 30 seconds at 2000 rpm in a speedmixer. Then 51.9 g of Sikron SF600 Quartz powder was added and mixed for a period of 30 seconds at 2000 rpm in a speedmixer. Finally, 0.26 g of deionized water was added in the mixture and mixed for a period of 30 seconds at 2000 rpm in a speedmixer.

Part B 10.4 g of 1,6-bis (trimethoxysilyl) hexane was mixed with 0.26 g of dimethyl tin dineodecanoate.

Mixture of Part A and Part B 130 g of part A was mixed with 2.7 g of part B for a period of 30 seconds at 2000 rpm in a speedmixer 4 times.

Comparative Example 9

This comparative example is using formulation of comparative example 8 replacing the tin catalyst by titanate catalyst.

51.9 g of Hydroxydimethylsilyl terminated polydimethyl siloxane exhibiting a viscosity at 23° C. of about 4,000 mPa·s (Brookfield cone plate viscometer RV DIII using a cone plate CP-52 at 20 rpm) was mixed with 25.95 g of trimethylsilyl terminated polydimethyl siloxane exhibiting a viscosity at 23° C. of about 100 mPa·s for a period of 30 seconds at 2000 rpm in a speedmixer. Then 51.9 g of Sikron SF600 Quartz powder was added and mixed for a period of 30 seconds at 2000 rpm in a speedmixer. Finally, 0.26 g of deionized water was added in the mixture and mixed for a period of 30 seconds at 2000 rpm in a speedmixer.

Part B 10.4 g of 1,6-bis (trimethoxysilyl) hexane was mixed with 0.26 g tetra n-butyl titanate.

Mixture of Part A and Part B 130 g of part A was mixed with 2.7 g of part B for a period of 30 seconds at 2000 rpm in a speedmixer 4 times.

Table 2a is a tabulation of the composition utilised to depict the type of formulation advised in WO2013100175. The results clearly indicating that the composition using titanate as catalyst fails to cure.

TABLE 2a

| Ingredients | Comparative example 8 Parts (by weight) | Comparative example 9 Parts (by weight) |
|---|---|---|
| Part A | | |
| Hydroxydimethylsilyl terminated polydimethyl siloxane 4,000 mPa.S | 40 | 40 |
| Trimethylsilyl terminated polydimethyl siloxane 100 mPa.S | 20 | 20 |
| Sikron SF600 Quartz powder | 40 | 40 |
| Water | 0.2 | 0.2 |
| Part B | | |
| 1,6-bis (trimethoxysilyl) hexane | 2 | 2 |
| Dimethyl tin dineodecanoate | 0.05 | |
| Tetra n-butyl titanate | | 0.05 |
| SiOH/Si-alkoxy | 0.0729 | 0.0729 |
| Mixing ratio A:B (weight) | 48.9 | 48.9 |

All following tensile strength and elongation tests were undertaken in accordance with ASTM D412-98a after curing under the conditions indicated.

TABLE 2b

| | Comparative example 8 | Comparative example 9 |
|---|---|---|
| Skin cure | 7 h | not curing |
| Hardness ASTM D2240 shore A after 7 days of cure at 23° C. and 50% relative humidity | 29 | not cured |
| Tensile strength after 7 days of cure at 23° C. and 50% relative humidity (MPa) | 0.21 | not cured |
| Elongation at break after 7 days of cure at 23° C. and 50% relative humidity (%) | 26 | not cured |
| Failure mode after 7 days of cure at 23° C. and 50% relative humidity % cohesive failure | 66 | not cured |

The results show unequivocally that despite the teaching of WO2013100175 that a titanate catalyst may be used in alternative to the tin catalyst, comparative example 9 shows unequivocally that the replacement of a tin catalyst by a titanate catalyst is not suitable, as it leads to a non-curing product. Moisture content in Sikron SF600 is around 0.24% in weight determined by ISO 787-2:1981. 40 parts of sikron contains 0.0053 mole parts of water. Additionally, 0.2 weight parts of water is added, which is equivalent to 0.011 molar parts in the formulation, which makes a total of 0.0163 mole part of water. 0.04 weight parts of Tetra n-butyl titanate is equivalent of 0.0000588 molar parts of catalyst, which is significantly below 50% of the molar portion of water present in the formulation as prescribed in the current disclosure.

Comparative Examples 10 & 11 Use Formulations Advocated in WO2007117551 and WO2007117552

Comparative Example 10

This comparative example is derived from Example 3 of WO2007117551 and WO2007117552, which describe two-part formulations based on a tin catalyst. Part A. 82.53 g of Hydroxydimethylsilyl terminated polydimethyl siloxane exhibiting a viscosity at 23° C. of about 13,500 mPa·s (Brookfield cone plate viscometer RV DIII using a cone plate CP-52 at 5 rpm) was mixed with 23.28 g of trimethylsilyl terminated polydimethyl siloxane exhibiting a viscosity at 23° C. of about 100 mPa·s (Brookfield cone plate viscometer RV DIII using a cone plate CP-52 at 20 rpm) for a period of 30 seconds at 2000 rpm in a speedmixer. Then 23.28 g of Evonik Aerosil R8200 was added in stepwise additions and mixed for a period of 30 seconds at 2000 rpm in a speedmixer. Finally, 0.91 g of Evonik polyvest OC 800s was added in the mixture and mixed for a period of 30 seconds at 2000 rpm in a speedmixer.

Part B 24 g of trimethylsilyl terminated polydimethyl siloxane exhibiting a viscosity at 23° C. of about 12,500 mPa·s (Brookfield cone plate viscometer RV DIII using a cone plate CP-52 at 5 rpm) was mixed with 5.195 g of Evonik Aerosil R974 in stepwise additions for a period of 30 seconds at 2000 rpm in a speedmixer. Then 8.66 g of aminoethylaminopropyl trimethoxy silane was added and mixed for a period of 30 seconds at 2000 rpm in a speedmixer. Then 5.022 g of tetra n-propyl orthosilicate was added and mixed for a period of 30 seconds at 2000 rpm in a speedmixer. Finally, 0.411 g of dimethyl tin dineodecanoate was added in the mixture and mixed for a period of 30 seconds at 2000 rpm in a speedmixer.

Mixture of Part a and Part B 130 g of part A was mixed with 13 g of part B for a period of 30 seconds at 2000 rpm in a speedmixer 4 times.

Comparative Example 11

This comparative example is using formulation of Comparative example 10, replacing the tin catalyst by a titanate catalyst.

Part A 82.53 g of Hydroxydimethylsilyl terminated polydimethyl siloxane exhibiting a viscosity at 23° C. of about 13,500 mPa·s (Brookfield cone plate viscometer RV DIII using a cone plate CP-52 at 5 rpm) was mixed with 23.28 g of trimethylsilyl terminated polydimethyl siloxane exhibiting a viscosity at 23° C. of about 100 mPa·s for a period of 30 seconds at 2000 rpm in a speedmixer. Then 23.28 g of Evonik Aerosil R8200 was added in stepwise additions and mixed for a period of 30 seconds at 2000 rpm in a speedmixer. Finally, 0.91 g of Evonik polyvest OC 800s was added in the mixture and mixed for a period of 30 seconds at 2000 rpm in a speedmixer.

Part B 24 g of trimethylsilyl terminated polydimethyl siloxane exhibiting a viscosity at 23° C. of about 12,500 mPa·s (Brookfield cone plate viscometer RV DIII using a cone plate CP-52 at 5 rpm) was mixed with 5.195 g of Evonik Aerosil R974 in stepwise additions for a period of 30 seconds at 2000 rpm in a speedmixer. Then 8.66 g of aminoethylaminopropyl trimethoxy silane was added and mixed for a period of 30 seconds at 2000 rpm in a speedmixer. Then 5.022 g of tetra n-propyl orthosilicate was added and mixed for a period of 30 seconds at 2000 rpm in a speedmixer. Finally, 0.411 g of tetra n-butyl titanate was added in the mixture and mixed for a period of 30 seconds at 2000 rpm in a speedmixer.

Mixture of Part A and Part B 130 g of part A was mixed with 13 g of part B for a period of 30 seconds at 2000 rpm in a speedmixer 4 times.

TABLE 2a

Formulations from WO2007117551, WO2007117552

| Ingredients | Comparative example 10 Parts (by weight) | Comparative example 11 Parts (by weight) |
| --- | --- | --- |
| Part A | | |
| Hydroxydimethylsilyl terminated polydimethyl siloxane 13,500 mPa.s | 63.8 | 63.8 |
| Trimethylsilyl terminated polydimethyl siloxane 100 mPa.s | 18 | 18 |
| Aerosil R8200 | 18 | 18 |
| Rheological additive polyvest OP 800s | 0.7 | 0.7 |
| Part B | | |
| Trimethylsilyl terminated polydimethyl siloxane 12.500 mPa.s | 55.45 | 55.45 |
| Aerosil R974 | 12 | 12 |
| Aminoethylaminopropyl trimethoxy silane | 20 | 20 |
| Tetra n-propyl orthosilicate | 11.6 | 11.6 |
| Dimethyl tin dineodecanoate | 0.95 | |
| Tetra n-butyl titanate | | 0.95 |
| SiOH/SiOR | 0.0706 | 0.0706 |
| Mixing ratio A:B (weight) | 10.0 | 10.0 |

Table 2b results using formulations taken from WO2007117551 and, WO2007117552. All following tensile strength and elongation tests were undertaken in accordance with ASTM D412-98a after curing under the conditions indicated.

TABLE 2b

| | Comparative example 10 | Comparative example 11 |
| --- | --- | --- |
| Skin cure | 50 min | 1 h 45 |
| Hardness ASTM D2240 shore A after 7 days of cure at 23° C. and 50% relative humidity | 21 (bulk cure) | 1 (skin cure) |
| Tensile strength after 7 days of cure at 23° C. and 50% relative humidity (MPa) | 0.31 | 0.03 (not cured inside) |
| Elongation at break after 7 days of cure at 23° C. and 50% relative humidity (%) | 74 | 8 (not cured inside) |

TABLE 2b-continued

| | Comparative example 10 | Comparative example 11 |
| --- | --- | --- |
| Failure mode after 7 days of cure at 23° C. and 50% relative humidity % cohesive failure | 0 | 0 (not cured inside) |

Here again, despite the teaching of WO2007117551 and WO2007117552 that a tin catalyst may be replaced by a titanate catalyst, Comparative example 10 and 11 indicate that the mere replacement of a tin catalyst by a titanate based catalyst simply leads to a material which cures only at the surface but not in the bulk of the product which is occurring in the present compositions. Moisture content of Aerosil R8200 and Aerosil R974 were found to be around 0.32 and 0.29% in weight determined by ISO 787-2:1981. There are 18 weight parts of Aerosil R8200 and 1.2 weight parts of Aerosil R974, which represents about 0.00339 molar parts of moisture in the mixed formulation. There is 0.095 weight part of titanate, which represents about 0.000279 molar parts of catalyst in the mixed formulation, which is much below 50% of the molar part of water present in the formulation as prescribed in the current disclosure.

Comparative Examples 12 & 13

Comparative examples 12 & 13 seek to show that WO2015091396 does not enable the use of titanium catalysts in such 2 part formulations despite discussions to the contrary.

Comparative Example 12

This comparative example is derived from Example 2 of WO2015091396, which describe two-part formulations, where all examples are based on tin catalyst.

Part A 67.6 g of Hydroxydimethylsilyl terminated polydimethyl siloxane exhibiting a viscosity at 23° C. of about 50,000 mPa·s (Brookfield cone plate viscometer RV DIII using a cone plate CP-51 at 0.5 rpm) was mixed with 4.55 g of trimethylsilyl terminated polydimethyl siloxane exhibiting a viscosity at 23° C. of about 100 mPa·s (Brookfield cone plate viscometer RV DIII using a cone plate CP-52 at 20 rpm) for a period of 30 seconds at 2000 rpm in a speedmixer. Then 3.25 g of Sikron SF600 Quartz powder was added and mixed for a period of 30 seconds at 2000 rpm in a speedmixer. Then 39 g of stearate treated ground calcium carbonate was added and mixed for a period of 30 seconds at 2000 rpm in a speedmixer. Then 6.50 g of Cabot LM150 fumed silica was added and mixed for a period of 30 seconds at 2000 rpm in a speedmixer. Finally, 9.1 g of Sid Richardson SR511 carbon black was added in the mixture and mixed for a period of 30 seconds at 2000 rpm in a speedmixer.

Part B 12.4 g of 1,6-bis (trimethoxysilyl) hexane was mixed with aminoethylaminopropyl trimethoxy silane for a period of 30 seconds at 2000 rpm in a speedmixer. Then 8.0 g of vinyldimethylsilyl terminated polydimethyl siloxane exhibiting a viscosity at 23° C. of about 2,000 mPa·s was added and mixed for a period of 30 seconds at 2000 rpm in a speedmixer. Then 3.2 g of tetraethyl orthosilicate was added and mixed for a period of 30 seconds at 2000 rpm in a speedmixer. Then 2.2 g of Cabot LM150 fumed silica was added and mixed for a period of 30 seconds at 2000 rpm in a speedmixer. Then, 8.8 g of Sid Richardson SR511 carbon black was added in stepwise additions in the mixture and mixed for a period of 30 seconds at 2000 rpm in a speedmixer. Finally, 0.40 g of dimethyl tin dineodecanoate was added in the mixture and mixed for a period of 30 seconds at 2000 rpm in a speedmixer.
Mixture of Part A and Part B
130 g of part A was mixed with 10 g of part B for a period of 30 seconds at 2000 rpm in a speedmixer 4 times.

Comparative Example 13

This comparative example is using formulation of Comparative example 12 replacing the tin catalyst by a titanate catalyst.
Part A
67.6 g of Hydroxydimethylsilyl terminated polydimethyl siloxane exhibiting a viscosity at 23° C. of about 50,000 mPa·s (Brookfield cone plate viscometer RV DIII using a cone plate CP-51 at 0.5 rpm) was mixed with 4.55 g of trimethylsilyl terminated polydimethyl siloxane exhibiting a viscosity at 23° C. of about 100 mPa·s (Brookfield cone plate viscometer RV DIII using a cone plate CP-52 at 20 rpm) for a period of 30 seconds at 2000 rpm in a speedmixer. Then 3.25 g of Sikron SF600 Quartz powder was added and mixed for a period of 30 seconds at 2000 rpm in a speedmixer. Then 39 g of stearate treated ground calcium carbonate was added and mixed for a period of 30 seconds at 2000 rpm in a speedmixer. Then 6.50 g of Cabot LM150 fumed silica was added and mixed for a period of 30 seconds at 2000 rpm in a speedmixer. Finally, 9.1 g of Sid Richardson SR511 carbon black was added in the mixture and mixed for a period of 30 seconds at 2000 rpm in a speedmixer.
Part B
12.4 g of 1,6-bis (trimethoxysilyl) hexane was mixed with aminoethylaminopropyl trimethoxy silane for a period of 30 seconds at 2000 rpm in a speedmixer. Then 8.0 g of vinyldimethylsilyl terminated polydimethyl siloxane exhibiting a viscosity at 23° C. of about 2,000 mPa·s (Brookfield cone plate viscometer RV DIII using a cone plate CP-52 at 20 rpm) was added and mixed for a period of 30 seconds at 2000 rpm in a speedmixer. Then 3.2 g of tetraethyl orthosilicate was added and mixed for a period of 30 seconds at 2000 rpm in a speedmixer. Then 2.2 g of Cabot LM150 fumed silica was added and mixed for a period of 30 seconds at 2000 rpm in a speedmixer. Then, 8.8 g of Sid Richardson SR511 carbon black was added in stepwise additions in the mixture and mixed for a period of 30 seconds at 2000 rpm in a speedmixer. Finally, 0.40 g of tetra n-butyl titanate was added in the mixture and mixed for a period of 30 seconds at 2000 rpm in a speedmixer.
Mixture of Part A and Part B
130 g of part A was mixed with 10 g of part B for a period of 30 seconds at 2000 rpm in a speedmixer 4 times.

TABLE 3a

| Formulations from WO2015091396 | | |
|---|---|---|
| Ingredients | Comparative example 12 Parts (by weight) | Comparative example 13 Parts (by weight) |
| Part A | | |
| Hydroxydimethylsilyl terminated polydimethyl siloxane 50,000 mPa.s | 52 | 52 |

TABLE 3a-continued

| Formulations from WO2015091396 | | |
|---|---|---|
| Ingredients | Comparative example 12 Parts (by weight) | Comparative example 13 Parts (by weight) |
| Trimethylsilyl terminated polydimethyl siloxane 100 mPa.s | 3.5 | 3.5 |
| Sikron SF600 Quartz powder | 2.5 | 2.5 |
| Ground calcium carbonate (Mickhaert) | 30 | 30 |
| Fumed silica (LM150) | 5 | 5 |
| Carbon black SR511 | 7 | 7 |
| Part B | | |
| 1,6-bis (trimethoxysilyl) hexane | 31 | 31 |
| Aminoethylaminopropyl trimethoxy silane | 12.5 | 12.5 |
| Vinyldimethylsilyl terminated polydimethyl siloxane 2,000 mPa.s | 20 | 20 |
| Tetra ethyl orthosilicate | 8 | 8 |
| Fumed silica (LM150) | 5.5 | 5.5 |
| Carbon black SR511 | 22 | 22 |
| Dimethyl tin dineodecanoate | 1 | |
| Tetra n-butyl titanate | | 1 |
| Mixing ratio A:B (weight) | 13.0 | 13.0 |

All following tensile strength and elongation tests were undertaken in accordance with ASTM D412-98a after curing under the conditions indicated.

TABLE 3b

| Results | | |
|---|---|---|
| | Comparative example 12 | Comparative example 13 |
| Skin cure | 10 | 25 |
| Hardness ASTM D2240 - 15 shore A after 7 days of cure at 23° C. and 50% relative humidity | 48 (bulk cure) | 1 (skin cure) |
| Tensile strength after 7 days of cure at 23° C. and 50% relative humidity (MPa) | 0.7 (bulk cure) | 0.03 (skin cure) |
| Elongation at break after 7 days of cure at 23° C. and 50% relative humidity (3/0) | 39 (bulk cure) | 13 (skin cure) |
| Failure mode after 7 days of cure at 23° C. and 50% relative humidity % cohesive failure | 92 (bulk cure) | 0 (skin cure) |

Despite the teaching of WO2015091396 that a titanate catalyst may be used in alternative to the tin catalyst, Comparative example 12 and 13 indicate that such a replacement does not provide a satisfactory product, as it leads to a material which cures only at the surface but not in the bulk of the product. Moisture content in Cabot LM 150 is about 0.78% in weight determined by ISO 787-2:1981. Moisture content in ground calcium carbonate (Mickhaert) is about 0.27% in weight determined by ISO 787-2:1981. There are 5.42 weight parts of Cabot LM 150 and 30 weight parts of ground calcium carbonate, which represents about 0.00685 molar parts of moisture in the mixed formulation. There is 0.077 weight part of titanate, which represents about 0.000226 molar parts of catalyst in the mixed formulation, which is again far below the 50% of the molar part of water present in the formulation as prescribed in the current disclosure.

The invention claimed is:
1. A multiple part condensation curable elastomer or gel composition based on titanate/zirconate cure catalysts, the composition comprising:
(i) at least one condensation curable silyl terminated polymer having at least one, optionally at least 2 hydroxyl functional groups per molecule;

(ii) a cross-linker selected from the group consisting of;
    silanes having at least 2 hydrolysable groups, optionally at least 3 hydrolysable groups per molecule, and/or
    silyl functional molecules having at least 2 silyl groups, each silyl group containing at least one hydrolysable group;
(iii) one or more hydrous fillers having a moisture content of >0.05% by weight as determined in accordance with ISO 787-2:1981; and
(iv) a condensation catalyst selected from the group consisting of titanates and/or zirconates;
    wherein polymer (i), cross-linker (ii) and condensation catalyst (iv) are not stored together in the same part; and
    wherein the condensation catalyst (iv) is present in a molar amount which is at least 50% of the moisture present cumulatively in the parts of the composition as determined in accordance with ISO 787-2:1981.

2. The multiple part condensation curable elastomer or gel composition in accordance with claim 1, wherein the molar ratio of condensation catalyst (iv) M-OR functions to the total of silicon-bonded hydroxyl groups is between 0.01:1 and 0.5:1, where M is titanium or zirconium.

3. The multiple part condensation curable elastomer or gel composition in accordance with claim 1, wherein the molar ratio of total silicon-bonded hydroxyl groups to hydrolysable groups from cross-linker (ii) is >0.1:1.

4. The multiple part condensation curable elastomer or gel composition in accordance with claim 1, wherein hydrous filler (iii) is selected from the group consisting of fumed and precipitated silicas, calcium carbonate, carbon black, hollow glass beads, and carbon nanotubes.

5. The multiple part condensation curable elastomer or gel composition in accordance with claim 1, wherein the composition is stored in two parts, Part A and Part B, with:
    a) Part A having polymer (i) and cross-linker (ii) and Part B having polymer (i) and condensation catalyst (iv); or
    b) Part A having polymer (i) and condensation catalyst (iv) and Part B having cross-linker (ii); or
    c) Part A having a first polymer (i) and cross-linker (ii) and Part B having a second polymer (i) and condensation catalyst (iv); or
    d) Part A containing polymer (i) and part B containing cross-linker (ii) and condensation catalyst (iv).

6. The multiple part condensation curable elastomer or gel composition in accordance with claim 5, wherein hydrous filler (iii) is stored in a part different from condensation catalyst (iv).

7. A method of making a gel or elastomer by mixing the parts of the multiple part condensation curable elastomer or gel composition in accordance with claim 1 to form a mixture and applying the mixture onto a substrate and curing.

8. An elastomeric or gel material which is the condensation reaction product of the multiple part condensation curable elastomer or gel composition in accordance with claim 1.

9. A coated substrate comprising a substrate and a coating disposed on the substrate, wherein the coating is formed from the multiple part condensation curable elastomer or gel composition in accordance with claim 1.

10. The multiple part condensation curable elastomer or gel composition in accordance with claim 1, wherein polymer (i) has at least 2 hydroxyl functional groups per molecule.

11. The multiple part condensation curable elastomer or gel composition in accordance with claim 1, wherein cross-linker (ii) is selected from the group consisting of silanes having at least 3 hydrolysable groups per molecule.

12. The multiple part condensation curable elastomer or gel composition in accordance with claim 2, wherein the molar ratio of total silicon-bonded hydroxyl groups to hydrolysable groups from cross-linker (ii) is >0.1:1.

13. The multiple part condensation curable elastomer or gel composition in accordance with claim 6, wherein a) Part A has polymer (i) and cross-linker (ii) and Part B has polymer (i) and condensation catalyst (iv).

14. The multiple part condensation curable elastomer or gel composition in accordance with claim 6, wherein b) Part A has polymer (i) and condensation catalyst (iv) and Part B has cross-linker (ii).

15. The multiple part condensation curable elastomer or gel composition in accordance with claim 6, wherein c) Part A has first polymer (i) and cross-linker (ii) and Part B has second polymer (i) and condensation catalyst (iv).

16. The multiple part condensation curable elastomer or gel composition in accordance with claim 6, wherein d) Part A contains polymer (i) and part B contains cross-linker (ii) and condensation catalyst (iv).

17. The coated substrate in accordance with claim 9, wherein the multiple part condensation curable elastomer or gel composition is applied on to the substrate using a dispenser.

18. The coated substrate in accordance with claim 17, wherein the dispenser is selected from the group consisting of curtain coaters, spray devices, die coaters, dip coaters, extrusion coaters, knife coaters, and screen coaters.

* * * * *